United States Patent Office 3,251,697
Patented May 17, 1966

3,251,697
PROCESS FOR PASTEURIZING EGG WHITE
Hans Lineweaver, Berkeley, and Franklin E. Cunningham, Pinole, Calif., assignors to the United States of America as represented by the Secretary of Agriculture
No Drawing. Filed Mar. 19, 1964, Ser. No. 353,303
8 Claims. (Cl. 99—161)

A non-exclusive, irrevocable, royalty-free license in the invention herein described, throughout the world for all purposes of the United States Government, with the power to grant sublicenses for such purposes, is hereby granted to the Government of the United States of America.

This invention relates in general to the processing of egg white. The principal objects of the invention include the provision of novel processes for preparing heat-stabilized egg white and the provision of the resulting heat-stabilized products as novel compositions of matter. Further objects of the invention will be evident from the following description wherein parts and percentages are by weight unless otherwise specified. The abbreviation "p.p.m." used herein means parts per million.

In commercial operations egg white is never sterile but has a variable content of adventitious microbial flora, depending on such factors as the quality of the eggs used, and the amount of care applied in the extracting, separating, and handling steps. In many cases the egg material contains salmonella organisms. The presence of these organisms is, of course, undesirable as they are pathogenic, producing the illness known as salmonellosis when ingested in sufficient quantity. Other pathogens such as staphylococci may also be present in egg materials. It is an obvious desideratum in producing good quality egg products to eliminate or at least substantially reduce the count of such bacterial contaminants. Although various techniques for reducing the bacterial count in egg products have been advocated, the processes have achieved only limited success on egg white materials. A critical factor is that the proteins of egg white are sensitive to heat. As a consequence, if egg white is subjected to a heat treatment severe enough to destroy all the contaminating organisms, coagulation of protein occurs and consequently the functional properties of the material are impaired, for example, its normal foaming power is largely destroyed. Because of this heat sensitivity factor, pasteurization must be restricted to moderate levels of heat treatment, and, as an inevitable result, only a limited degree of bacterial destruction is attained. As an example of the situation, it has been shown in the art that 135° F. is the maximum temperature to which egg white can be heated even for short times (1 or 2 minutes) without serious coagulation effects and at such a temperature the bacterial count is only reduced to a limited degree and does not insure a satisfactory reduction of pathogenic bacteria.

The fact that egg white proteins are sensitive to heat gives rise to problems not only in pasteurizing processes but in other operations where it is necessary to heat the egg material. Such heating may be involved, for example, in procedures for preparing concentrated liquid egg products and for preparing dehydrated egg products. Because of the possibility of protein coagulation, it is essential in such procedures to limit the maximum temperature to which the egg material is subjected and as a consequence the output of concentrated or dried product is less than that which is obtained with otherwise comparable materials which do not exhibit such heat sensitive properties. In other words, because of the heat sensitivity aspect, processes which involve application of heat to egg white are not susceptible to being carried out at the levels of efficiency which the systems or devices in question are capable of delivering.

In accordance with the invention, the heat sensitivity of egg white is reduced by a single yet very effective means. This desirable stabilizing effect is attained by incorporating into liquid egg white a minor amount of any one of certain polyvalent metals, employed in combined form, i.e., as salts thereof. The consequent reduction in heat sensitivity yields important practical advantages. For example, it enables egg white to be subjected to heating programs more severe (as to temperature, time of heating, or both) than in known pasteurization treatments, whereby to attain enhanced destruction of adventitious microflora, yet without impairing its functional properties. Also, the invention enables egg white to be processed at higher temperatures—for example, in concentrating and dehydrating operations—whereby more efficient results are attained and without impairment of functional properties.

Generically, the invention encompasses the addition of a salt of any one of the following polyvalent metals: aluminum, iron, copper, nickel, manganese, cobalt, zinc, or cadmium. The critical function of the salt is that it provides cations of at least one of the metals listed above; the anion moiety of the salt is of no significance, with the obvious exception that where the product is intended for food purposes it should be derived from a non-toxic acid. Typically, one may use such salts as chlorides, lactates, acetates, sulphates, nitrates, etc. Since the additive is used in very low concentration, even salts which possess but a slight solubility in water can be used. In cases where the metals are capable of existing in more than one valence state, the higher valence state is preferred. Thus ferric salts are preferred to ferrous, cupric to cuprous, etc. Generally, it is preferred to use a salt of one selected metal as the additive. However, it is within the purview of the invention to use two or more of the metals, for example, mixtures of salts of the above-listed metals. In adding the selected polyvalent metal salt to the egg white, it is preferred that the salt be first dissolved in water to form a dilute solution and this solution is then mixed with the egg white. Such a procedure prevents any formation of a localized high concentration of polyvalent metal ions which might cause protein precipitation or other undesirable effects. However, if the pH of the egg white is first adjusted to about 7, dilution is not needed; the salts can be incorporated into the egg white as crystals or powder.

Although all of the polyvalent metals listed above exhibit the ability of decreasing the heat sensitivity of egg white, it is not maintained that all of them are of equal effectiveness. As a matter of fact, there are marked differences among them. Of the group, aluminum and iron (ferric) exhibit an approximately equal and very high ability to stabilize egg white. Of the two, aluminum is preferred as it does not cause any color change in the product; ferric iron causes development of a rosy color and is less preferred for that reason. Another item relating to our preference for aluminum is that most microbial organisms do not utilize this metal as a mineral nutrient. Thus if egg white containing added aluminum is stored under conditions at which microbial growth is possible, it will not favor growth of microorganisms to a greater extent than would untreated egg white held under the same conditions. This is not the case with some of the other polyvalent metals described herein. For example, iron is well known to be essential in the life cycle of many microorganisms and addition thereof to egg white will increase the nutrient value of the egg material with relation to microbial forms. Although the above factors play a part in pointing up the particular usefulness of aluminum, the distinction is only of importance when the treated egg white is to be stored under conditions wherein microbial growth may occur—for example, holding for substantial periods at ambient or cold-storage temperatures. Where the products are frozen, concentrated, dehydrated, or otherwise treated to substantially prevent microbial growth, the presence or absence of mineral growth factors is of no importance. Copper exhibits a somewhat lesser degree of stabilization effect than aluminum and ferric iron. Also, it gives the egg white a greenish color which may be considered objectionable. The remaining metals—nickel, manganese, cobalt, zinc, and cadmium—generally display a substantially lesser degree of heat stabilization than copper, ferric iron or aluminum. However, their activity varies with the pH of the egg material. For example, at a neutral pH cadmium confers a substantially lesser degree of heat stabilization than copper, ferric iron or aluminum whereas at a pH of about 9 it confers somewhat more heat stabilizing effect than copper, ferric iron, or aluminum.

It is to be emphasized that the addition of the aforesaid polyvalent metals does not impair the egg material; its vital attributes such as aeration, binding, and other functional properties, flavor, etc., are retained unaltered. As a consequence, egg white with the added polyvalent metal is useful in all the various applications in which egg white is conventionally used, for example, in bakery products such as angle food cakes and meringues, in mayonnaise, salad dressings, custards, prepared cake mixes, etc. As a matter of fact, our researches have indicated that even in situations where no heat is applied the addition of the polyvalent metal, especially ferric iron or aluminum, causes small but significant increases in functional properties, e.g., increase in volume of angle food cakes. It may be noted at this point that addition of some of the metals cause a color change. For example, addition of a ferric salt gives the egg material a rosy hue. This color change is, however, of little consequence compared to the stabilizing benefit attained. Moreover, when the products are incorporated into baked goods such as cakes the rosy color disappears. Thus at high temperatures, as used in baking, the egg material is restored to its natural color. With products such as meringues, a pink color will persist in those cases where the degree of baking is not such as to attain complete protein denaturation. A comparable situation is presented with addition of a copper salt. In such case a greenish color develops which disappears when the treated egg white is incorporated into cake ingredients and baked. As noted above, aluminum is the preferred metal because of its effectiveness plus the fact that it does not cause any color change.

Our investigations have revealed that optimum results in stabilizing egg white against heat damage are obtained by adding such a quantity of the selected salt that the concentration of polyvalent metal ions in the mixture (egg material plus added salt) is about 0.001 to 0.003 molar. Concentrations above this level may be used but provide little if any extra benefit. When the degree of heating of the egg material is decreased, lesser concentrations of polyvalent metal may be used. In general, it has been found that any amount of added polyvalent metal provides some stabilizing effect but ordinarily we use sufficient to provide a concentration thereof in the mixture of at least 0.0003 molar. Since the optimum amount of polyvalent metal required in any particular case will vary with such factors as the type of egg material, the severity of the heat treatment to which it is to be exposed, etc., one may conduct pilot trials with samples of the egg material containing graded levels of added salt, exposing them to the heat treatment selected and then subjecting the heated materials to standard tests whereby to select the level of polyvalent metal salt which provides the desired degree of protection.

The fact that the polyvalent metals are used in very minor amount is demonstrated by the data in the following table where molar concentrations of various metals in liquid egg white are compared with the concentrations calculated as parts per million, both on the liquid (wet) basis and on a dry basis (as would be the case were the treated egg white dried to a solid).

| Metal | Equivalent concentrations | | |
|---|---|---|---|
| | Molar | P.p.m. (wet basis) | P.p.m. (dry basis) |
| Aluminum | 0.0003 | 8 | 67 |
| Do | 0.001 | 27 | 225 |
| Do | 0.003 | 81 | 675 |
| Iron | 0.0003 | 17 | 140 |
| Do | 0.001 | 56 | 466 |
| Do | 0.003 | 168 | 1,398 |
| Copper | 0.0003 | 19 | 158 |
| Do | 0.001 | 64 | 534 |
| Do | 0.003 | 192 | 1,600 |

Although the addition of the aforesaid polyvalent metals provides beneficial results per se, it has been observed that even more effective results are obtained when the addition thereof is coupled with an adjustment of the pH of the egg white to a level below its natural pH (about 9). In particular, it has been observed that when egg white with added polyvalent metal but at its natural pH is heated to temperatures above 135° F., coagulation is suppressed but the viscosity is increased substantially. This effect of viscosity increase can be prevented very simply by reducing the pH of the egg white. For best results the pH is adjusted to a level of 6.5 to 7. However, in general, beneficial results are obtained at pH's in the range 6 to 8. For the pH adjustment one may employ non-toxic acids as, for example, hydrochloric, lactic, acetic, sulphuric, etc. If for any reason it is desired that the final product have its natural pH, one can add an alkaline agent—such as sodium hydroxide, carbonate, or bicarbonate—in the appropriate amount after the egg material (with added polyvalent metal salt and acid) has been subjected to a heating operation. As an example: If only pasteurization is involved in the heating step, the pH restoration would be carried out after the stabilized egg material had undergone such pasteurizing treatment. When spray drying (with or without prior pasteurizing action) is involved, the alkaline agent—sodium bicarbonate, for example—may be mixed with the dry product in such proportion that when the product is reconstituted its natural pH will be re-established. It is to be observed that the art is familiar with the idea of acidifying egg white before applying such procedures as de-sugaring, whipping, spray drying, etc., and no claim is made herein that acidification, per se, is new with us.

It is obvious from the foregoing that the treatment of the egg white (addition of polyvalent metal and preferably also pH adjustment) is applied before any heating of the egg material. The treatment of the invention may be applied in connection with the use of other additives such as sugar, corn syrup solids, whipping agents, antioxidants, flavoring agents, etc. The egg white may be in natural condition or have been subjected to such treatments as deglucosing by fermentation or enzyme action. Following treatment of the egg material in accordance with the invention, it may be further processed as desired, for instance, by applying such procedures as freezing, concentrating, deglucosing, drying, pasteurizing, or any combinations of these.

The ability of the aforesaid polyvalent metal ions to stabilize egg proteins is believed to involve the following principles, not recognized heretofore: Our researches on the heating of egg white led to a finding that of the various egg white proteins, conalbumin exhibits the greatest instability. Thus when egg white is held at an elevated temperature, for example at 140° F., the conalbumin is quickly coagulated; the other proteins—ovalbumin, lysozyme, ovomucin, ovomucoid, and uncharacterized globulins—are relatively stable and are not coagulated unless the heating is prolonged. Moreover, we found that when any one of the aforesaid polyvalent metals is added before such heating, the conalbumin does not coagulate at temperatures and times desired for pasteurization (i.e., 140°–145° F., for several minutes). In other words, it is believed that the additive has the specific effect of increasing the thermal stability of conalbumin. However, although the above mechanism is believed to be involved, it is not intended that the invention be limited by this or any other theory.

In applying the present invention in situations where it is desired to produce an egg white containing a minimum of bacterial contaminants, the egg white with added polyvalent metal (or, preferably, with both polyvalent metal and acid) is subjected to heat treatment, for example, in conventional pasteurizing equipment. The conditions of the treatment will vary considerably dependent on many factors. For example, if a higher temperature is selected, adequate results are achieved in a shorter time than in a situation wherein a lower temperature is employed. Such factors as efficiency of heat transfer also enter the picture, for example, if the applied temperature is rapidly transferred throughout the body of material, the time of treatment will be less than in a case where a lower rate of heat transfer is attained. Another very significant variable involves the microbial population of the starting material. For example, a greater load of microbial contaminants will necessitate a higher temperature or a longer processing time or both to achieve the same degree of microbial destruction. This item is illustrated by the following example well known to those skilled in the food canning art: If the spore load on a product to be preserved is increased from 1000 spores per can to 1,000,000 spores (of the same heat resistance) the process time must be approximately doubled. The pH of the egg material also has an effect and generally a lower pH will permit a less severe heating program. A factor which cannot be predicted on any practical basis is the heat resistance of the spores encountered. Thus the spores present in the material to be treated may exhibit thermal death rates which differ by factors of 1000 or more. Moreover, it is not practicable to determine what types of spores are present or what thermal death rates they possess. Such a program would be too extensive and involved. Moreover, it would only apply to one sample of material; others might exhibit entirely different spore populations. The net result is that the only feasible method for determining adequate heat processing program is to conduct field trials at different times and temperatures and to assay the product for microbial content. Taking into account these considerations, in carrying out the process of this invention, the treated egg white is subjected to a pasteurization procedure adequate as to temperature and time of heating to attain the desired degree of bacterial kill yet not severe enough to damage the egg proteins. It is, of course, to be understood that because of the presence of the added polyvalent metal one can effectively use a combination of temperature and time greater than with previously known pasteurization treatments for egg white. In the presence of the added polyvalent metal the temperature, the time of heating, or both, may be greater than with known procedures, resulting in a greater reduction in bacterial count yet without damage to the egg material.

It is recognized that there are known procedures which involve addition of aluminum salts to egg white. Littlefield (U.S. Patent 2,166,070) discloses adding an aluminum salt to egg white and then spray drying the composite material. The patentee uses a substantial proportion of aluminum, namely, a minimum of ¾ gram of aluminum per pound of dried egg white (equivalent to 1650 p.p.m. on solids basis) and preferably at least 1 gram of aluminum per pound of dried egg white (equivalent to 2200 p.p.m. on solids basis). The patentee relies on these large amounts of aluminum to act as a drying agent to increase the water-holding properties of the egg white foam. In contrast, the present invention employs much smaller amounts of aluminum (as little as one-twentieth of Littlefield's minimum concentration) and achieves a result—reduction of heat sensitivity of egg white proteins—which is totally alien to the patentee's teachings. Similar to Littlefield, and equally irrelevant, is the Werbin Patent 2,614,046 which discloses the addition of alum (sodium aluminum sulphate) to egg white to enhance its whipping characteristics. Werbin uses 0.7 gram of alum per 5 grams of dried egg white which is equivalent to a proportion of aluminum of 8000 p.p.m. on a solids basis.

The invention is further demonstrated by the following illustrative examples:

*Example I*

A batch of egg white was acidified to pH 7.0 by adding dilute hydrochloric acid. To one portion of the acidified egg white was added sufficient 0.01 M ferric chloride to provide a concentration of ferric chloride in the mixture of $3 \times 10^{-4}$ M. Nothing was added to the other portion.

The samples of acidified egg white (with and without added iron) were heated at 60° C. for 10 minutes, 3 minutes being required for the material to come up to the designated temperature. The heated samples were quickly cooled and subjected to tests to determine their functional qualities. In one test the egg white at room temperature (plus 1 gram sucrose per 5 grams egg white) was whipped and the time required to form medium peaks was measured. In this test, a shorter time indicates a better aeration ability. In another test the egg white products were used to prepare standard angel food cakes, the volume and texture of these being determined. With this test, a higher cake volume indicates a better egg white. For comparative purposes, similar tests were carried out on the unheated acidified egg white, with and without added iron.

The results are summarized below:

TABLE 1A.—PROPERTIES OF EGG WHITES (pH 7.0) WITH AND WITHOUT ADDED IRON (NOT HEATED)

| Run | Conc. of added iron, molar | Appearance | Whip time, sec. | Cake volume, ml. | Cake texture |
|---|---|---|---|---|---|
| 1 | None | Clear | 22.5 | 632 | Typical. |
| 2 | $3 \times 10^{-4}$ | do | 22.5 | 650 | Do. |

TABLE 1B.—PROPERTIES OF EGG WHITE (pH 7.0) WITH AND WITHOUT ADDED IRON, HEATED 60° C. (140° F.), 10 MINUTES

| Run | Conc. of added iron, molar | Appearance | Whip time, sec. | Cake volume, ml. | Cake texture |
|---|---|---|---|---|---|
| 3 | None | Coagulated | 110 | 629 | Poor. |
| 4 | $3 \times 10^{-4}$ | Clear | 35 | 652 | Typical. |

The above data indicate the striking effect of added iron in stabilizing egg white to heat. Thus in the absence of iron the heating caused a five-fold increase in whipping time whereas with added iron the heating did not cause even a doubling in whipping time.

*Example II*

Samples of egg white were acidified to pH 7.0 (with dilute HCl) and to them were added varying amounts of ferric chloride. The samples were then heated at 64° C. for 7 minutes (3 minutes were required for the material to reach the stated temperature). The products were assayed by determining the whipping time. Also, the degree of coagulation after heating was estimated by appearance of the samples.

The results are tabulated below:

TABLE 2.—PROPERTIES OF EGG WHITE (pH 7.0) WITH ADDED IRON AT DIFFERENT LEVELS, HEATED 64° C. (147° F.), 7 MINUTES

| Run | Iron conc., molar | Degree of coagulation after heating [1] | Whip time, sec. |
|---|---|---|---|
| 1 | [2] | 5 | [3] |
| 2 | 0.0004 | 3 | 112 |
| 3 | 0.0008 | 0 to 1 | 102 |
| 4 | 0.0016 | 0 | 96 |
| 5 | 0.0032 | 0 | 96 |

[1] Judged by scale: 0=no coagulation, 5=total coagulation.
[2] None added.
[3] Product was so thoroughly coagulated that it could not be whipped.

*Example III*

In this series, samples of egg white containing added ferric chloride ($8 \times 10^{-4}$ M) were acidified to different pH's with dilute hydrochloric acid. The samples were then heated at 60° C. for 5 minutes (this time excluding 3 minutes come-up time). After quickly cooling, the products were all adjusted to pH 7.0 and tested for whipping time.

The results are tabulated below:

TABLE 3.—PROPERTIES OF EGG WHITE CONTAINING ADDED IRON ($8 \times 10^{-4}$ M), ACIDIFIED TO VARIOUS pH LEVELS AND HEATED 60° C. (140° F.), 5 MINUTES

| Run | pH | Whip time, sec. | |
|---|---|---|---|
| | | Before heating | After heating |
| 1 | 7.40 | 37.8 | 53.5 |
| 2 | 7.10 | 32.8 | 36.8 |
| 3 | 6.93 | 26.7 | 30.3 |
| 4 | 6.81 | 28.9 | 29.1 |
| 5 | 6.59 | 30.3 | 29.3 |

*Example IV*

Samples of egg white were acidified to pH 7.0 (with dilute hydrochloric acid). To one of the samples was added aluminum in a concentration of 0.001 molar (added as aluminum chloride). Both samples were heated at 60° C. for 10 minutes (three minutes were required for the material to reach the stated temperature). The products were assayed as described in Example I.

The results are tabulated below:

TABLE 4.—PROPERTIES OF EGG WHITE (pH 7.0) WITH AND WITHOUT ADDED ALUMINUM HEATED 60° C. (140° F.), 10 MINUTES

| Conc. of added Al, molar | Whip time, sec. | Cake volume, ml. |
|---|---|---|
| None (control) | 124 | 619 |
| 0.001 | 58 | 685 |

*Example V*

A. To a series of samples of egg white, adjusted to pH 7.0, there was added various metals (in salt form), each at a concentration of 0.001 molar. Each sample was heated at 65° C. while noting the appearance of the material in order to determine the time at which the material became cloudy, such point indicating the onset of protein coagulation. The data provides an estimate of the effectiveness of polyvalent metals of this invention in reducing thermal sensitivity of egg white proteins. It is, of course, obvious that a longer time to develop cloudiness indicates a greater efficacy in reducing the heat sensitivity of the egg proteins. Several metals not included within the ambit of the invention were also employed for comparative purposes.

The results are tabulated below:

TABLE 5A.—EFFECT OF VARIOUS METALS ON EGG WHITE AT pH 7, HELD AT 65° C.

| Metal added | Valence of added metal | Time to develop cloudiness, sec. |
|---|---|---|
| Aluminum | 3 | >120 |
| Iron | 3 | >120 |
| Copper | 2 | 120 |
| Cobalt | 2 | 60 |
| Zinc | 2 | 55 |
| Manganese | 2 | 55 |
| Nickel | 2 | 41 |
| Cadmium | 2 | 40 |
| Calcium | 2 | 30 |
| Magnesium | 2 | 30 |
| Mercury | 2 | 30 |
| Lead | 2 | 30 |
| None | | 30 |

B. The procedure set forth above in part A was repeated except that in this instance the egg white was at its normal pH of 9.

The results are given below:

TABLE 5B.—EFFECT OF VARIOUS METALS ON EGG WHITE AT pH 9, HELD AT 65° C.

| Metal added | Valence of added metal | Time to develop cloudiness, sec. |
|---|---|---|
| Cadmium | 2 | 130 |
| Aluminum | 3 | 120 |
| Iron | 3 | 120 |
| Cobalt | 2 | 110 |
| Copper | 2 | 105 |
| Nickel | 2 | 100 |
| Manganese | 2 | 100 |
| Zinc | 2 | 100 |
| Magnesium | 2 | 80 |
| Calcium | 2 | 70 |
| Mercury | 2 | 70 |
| Lead | 2 | 65 |
| None | | 70 |

*Example VI*

A series of runs were carried out in which 90-pound batches of egg white were passed through a conventional pasteurizer wherein each batch of liquid was held at 140° F. for 3 minutes. In all cases the pH of the egg white was 7 (obtained by adding dilute hydrochloric acid). In one run the egg white contained 25 p.p.m. of aluminum (added as aluminum chloride); in another, the egg white contained 50 p.p.m. of iron (added as ferric chloride); in the third no metal was added, thus to provide a control.

After leaving the pasteurizer the hot liquids were cooled quickly and tested for performance quality by preparing standard angel food cakes. In conducting these tests, each batch of egg white was divided into separate samples each of which was subjected to whipping for various times, longer and shorter than the time required for formation of medium peaks, and separate cakes were prepared using each of such samples of meringue. The volume of each cake was measured to determine which meringue from each batch produced maximum cake volume. The maximum cake volumes obtained and the corresponding whipping times are set forth in the following table.

Also, bacterial counts were run on the original egg white and on the three products. This data is also in the table below.

| Run | Metal added | Conc. of added metal, p.p.m. (wet basis) | Bacterial count after heating at 140° F., 3 min.[1] bacteria/ml. | Whipping time required for maximum cake volume, sec. | Cake volume (maximum) ml. |
|---|---|---|---|---|---|
| 1 | Al | 25 | 110 | 37 | 665 |
| 2 | Fe | 50 | 40 | 40 | 687 |
| 3 (control) | None | 0 | 45 | [2] 96 | 651 |

[1] Bacterial count before heating was 1.06 x 10⁴ bacteria/ml.
[2] It is of interest to note that when the whipping time applied to this product (control) was reduced to 80 sec., the cake volume was only 601 ml.

Current U.S.D.A. regulations for the pasteurization of liquid egg specify that the liquid egg be held at a temperature not less than 140° F. for 3½ to 4 minutes. This procedure does not damage the properties of some types of egg liquid—for example, whole egg and yolk—and consequently can be applied to such products. It cannot be applied to egg white, however, as it would cause extensive coagulation of the proteins thereof. The previous examples show that the invention described herein makes it possible to utilize the said conditions with egg white without damaging it, such result having been previously impossible to attain. The following example shows that the stabilizing treatment of the invention does not increase the stability of Salmonella. In other words, the desirable result of the invention is not offset by any increased difficulty in destroying Salmonella organisms which may be present in the starting material.

*Example VII*

Runs were carried out in which samples of egg white were held at 140° F. for predetermined times (as given below). In all cases the egg white was adjusted to pH 7 (obtained by adding dilute hydrochloric acid) and was inoculated with *Salmonella typhimurium*. In one series, the egg white also contained aluminum (added as aluminum chloride) in a concentration of 0.001 molar; in the other series no metal was added, thus to provide controls.

After the heat treatments, the liquids were quickly cooled and assayed for *S. typhimurium*. The results are tabulated below:

TABLE 7—DESTRUCTION OF *S. TYPHIMURIUM* AT 140° F. IN EGG WHITE AT pH 7, WITH AND WITHOUT ALUMINUM

| Time held at 140° F., min. | Count of *S. typhimurium* organisms/ml. | |
|---|---|---|
| | With added aluminum (0.001 M) | Without aluminum |
| 0 | 1,000,000 | 400,000 |
| 0.5 | 5,000 | 8,000 |
| 1 | <100 | <100 |
| 2 | (¹) | (¹) |
| 3 | (¹) | (¹) |
| 3½ | (¹) | (¹) |

[1] None found.

Having thus described our invention, we claim:

1. A process for pasteurizing egg white which comprises adding to the egg white a salt of a polyvalent metal selected from the group consisting of aluminum, iron, copper, nickel, manganese, cobalt, zinc, and cadmium in a concentration of about from 0.0003 to 0.003 molar and heating the treated egg white at a pasteurization temperature, the added metal reducing the heat sensitivity of the egg proteins and thereby preventing protein coagulation.

2. The process of claim 1 wherein the polyvalent metal is aluminum.

3. The process of claim 1 wherein the polyvalent metal is iron in the ferric state.

4. The process of claim 1 wherein the pH of the egg white is adjusted to a value about from 6 to 8 prior to heating.

5. A process for pasteurizing egg white which comprises adding to the egg white a salt of a polyvalent metal selected from the group consisting of aluminum, iron, copper, nickel, manganese, cobalt, zinc, and cadmium in a concentration of about from 0.0003 to 0.003 molar and subjecting the treated egg white to pasteurization, the combination of temperature and time of heating applied in said pasteurization being greater than the egg white could have withstood, without protein coagulation, in the absence of said added polyvalent metal.

6. The process of claim 5 wherein said polyvalent metal is aluminum.

7. The process of claim 5 wherein the polyvalent metal is iron in the ferric state.

8. The process of claim 5 wherein the pH of the egg white is adjusted to a level of about from 6.5 to 7 prior to pasteurization.

References Cited by the Examiner

UNITED STATES PATENTS 2,166,070    7/1939    Littlefield _____ 99—113
3,156,570   10/1964    Holme _____ 99—161

A. LOUIS MONACELL, *Primary Examiner.*

L. M. SHAPIRO, *Assistant Examiner.*